(12) United States Patent
Miyaji (10) Patent No.: US 10,609,257 B2
(45) Date of Patent: Mar. 31, 2020

(54) IMAGE PROCESSING APPARATUS WITH SHEET REMOVAL MONITORING FOR SHEETS WITH PROTECTION-TARGET IMAGE

(71) Applicant: KYOCERA Document Solutions Inc., Osaka-shi, Osaka (JP)

(72) Inventor: Hikaru Miyaji, Osaka (JP)

(73) Assignee: KYOCERA Document Solutions Inc., Osaka-shi, Osaka (JP)

( * ) Notice: Subject to any disclaimer, the term of this patent is extended or adjusted under 35 U.S.C. 154(b) by 0 days.

(21) Appl. No.: 16/261,454

(22) Filed: Jan. 29, 2019

(65) Prior Publication Data

US 2019/0238718 A1  Aug. 1, 2019

(30) Foreign Application Priority Data

Jan. 31, 2018 (JP) ................. 2018-014522

(51) Int. Cl.
*G06F 3/12* (2006.01)
*H04N 1/44* (2006.01)
*H04N 1/00* (2006.01)
*H04N 1/17* (2006.01)

(52) U.S. Cl.
CPC ........... *H04N 1/444* (2013.01); *G06F 3/1222* (2013.01); *G06F 3/1238* (2013.01); *G06F 3/1287* (2013.01); *H04N 1/00689* (2013.01); *H04N 1/17* (2013.01)

(58) Field of Classification Search
CPC ...... H04N 1/444; H04N 1/00689; H04N 1/17; H04N 1/00222; H04N 1/4413; H04N 1/00798; G06F 3/1222; G06F 3/1238; G06F 3/1287; G06F 3/126

USPC ................. 358/1.1–1.18, 1, 9, 402, 474, 486
See application file for complete search history.

(56) References Cited

U.S. PATENT DOCUMENTS

| 8,351,091 B2* | 1/2013 | Kojima | H04N 1/00222 |
| | | | 358/1.15 |
| 2015/0312437 A1* | 10/2015 | Hannaguchi | H04N 1/00798 |
| | | | 358/474 |
| 2016/0191741 A1* | 6/2016 | Tsukimori | H04N 1/17 |
| | | | 358/486 |

FOREIGN PATENT DOCUMENTS

JP  2000352916 A  12/2000

* cited by examiner

*Primary Examiner* — Gabriel I Garcia
(74) *Attorney, Agent, or Firm* — Alleman Hall Creasman & Tuttle LLP (57) ABSTRACT

In an image processing apparatus, a protection-target document sheet determining portion determines whether or not a protection-target image is included in a read image that is obtained by an image reading device, the protection-target image satisfying a predetermined protection condition. An operation detection sensor detects a removal operation of removing the document sheet from the document sheet support portion. An image output device executes a read image output process that includes printing the read image or outputting data of the read image to outside. A control device, in a case where it has been determined that a protection-target image is included in the read image, causes the image output device to execute the read image output process only after the removal operation is detected after the image is read from the document sheet.

3 Claims, 4 Drawing Sheets

IMAGE PROCESSING APPARATUS WITH SHEET REMOVAL MONITORING FOR SHEETS WITH PROTECTION-TARGET IMAGE

INCORPORATION BY REFERENCE

This application is based upon and claims the benefit of priority from the corresponding Japanese Patent Application No. 2018-014522 filed on Jan. 31, 2018, the entire contents of which are incorporated herein by reference.

BACKGROUND

The present disclosure relates to an image processing apparatus including an image reading device.

An image processing apparatus such as a copier, a scanner, a facsimile apparatus, or a multifunction peripheral includes an image reading device for reading an image from a document sheet. The image processing apparatus has a function to transmit data of the image read from the document sheet to another apparatus.

The image processing apparatus may further include an image forming device for forming an image on a sheet. In this case, the image processing apparatus can execute a copy process that includes an image reading process and a print process.

According to a known image processing apparatus, in the copy process, after the image reading process is completed, the print process is executed only when a removal of the document sheet from the image reading device has been detected. This function is aimed to prevent the document sheet from being forgotten to be taken from the image reading device.

SUMMARY

An image processing apparatus according to an aspect of the present disclosure includes a document sheet support portion, an image reading device, a protection-target document sheet determining portion, an operation detection sensor, an image output device, and a control device. The document sheet support portion supports a document sheet. The image reading device reads an image from the document sheet supported by the document sheet support portion. The protection-target document sheet determining portion determines whether or not a protection-target image is included in a read image that is obtained by the image reading device, the protection-target image satisfying a predetermined protection condition. The operation detection sensor detects a removal operation of removing the document sheet from the document sheet support portion. The image output device executes a read image output process that includes printing the read image or outputting data of the read image to outside. The control device, in a case where the protection-target document sheet determining portion has determined that a protection-target image is included in the read image, causes the image output device to execute the read image output process only after the operation detection sensor detects the removal operation after the image reading device reads the image from the document sheet.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

The following describes embodiments of the present disclosure with reference to the accompanying drawings. It should be noted that the following embodiments are examples of specific embodiments of the present disclosure and should not limit the technical scope of the present disclosure.

First Embodiment

Figure 1:
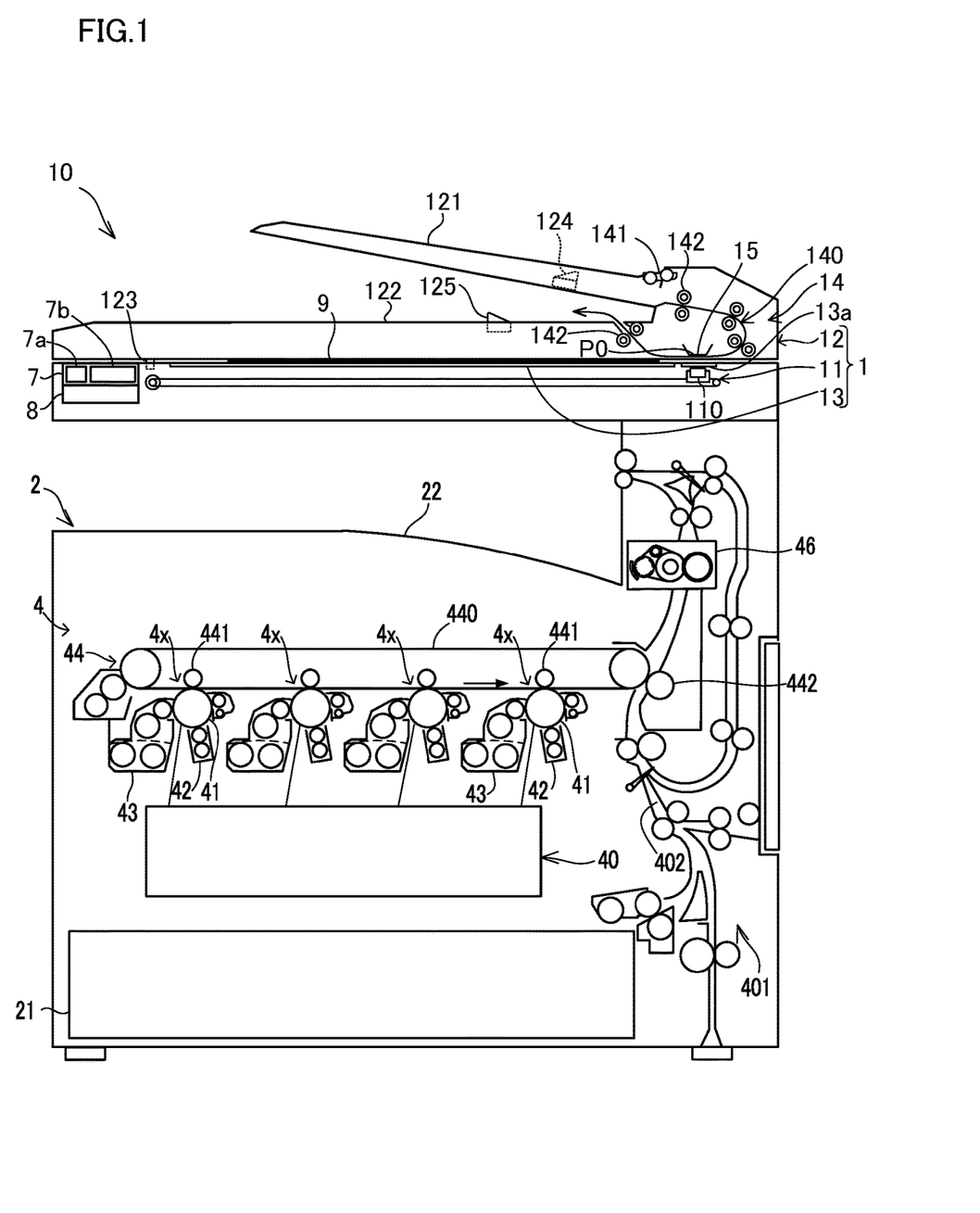
FIG. 1 is a configuration diagram of an image processing apparatus according to a first embodiment.

In a first embodiment, an image processing apparatus 10 executes an image reading process of reading an image(s) from a document sheet(s) 9, and an image output process based on a read image(s) obtained by the image reading process (see FIG. 1). In the following description, the image output process that is executed based on the read image(s) is referred to as a read image output process.

The read image output process includes a print process or an image data output process, wherein in the print process, an image(s) is formed on a sheet(s) based on a read image(s), and in the image data output process, data of a read image(s) is output to outside. The sheet is a sheet-like image formation medium such as a sheet of paper or an OHP sheet. For example, the image data output process includes an image data transmission process or an image data recording process.

Figure 2:
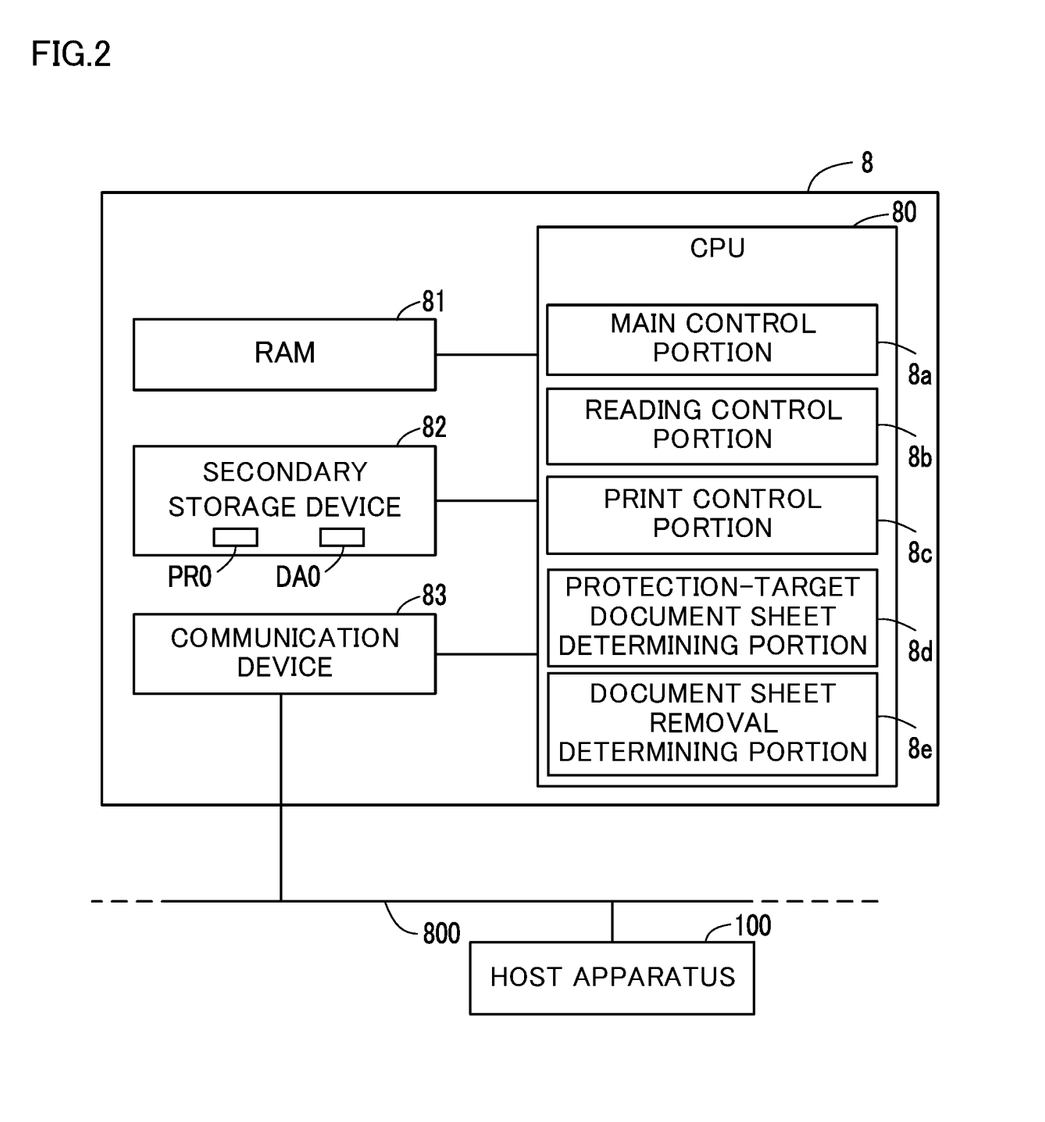
FIG. 2 is a block diagram of a control device of the image processing apparatus according to the first embodiment.

In the image data transmission process, data of a read image(s) is transmitted to another apparatus, such as a host apparatus 100, via a network 800 (see FIG. 2). The host apparatus 100 is an information processing apparatus such as a personal computer that communicates with the image processing apparatus 10.

In the image data recording process, data of a read image(s) is recorded onto an external storage device that can be attached to the image processing apparatus 10 in a detachable manner. The external storage device is, for example, a portable memory unit or a memory card. It is noted that a copy process is a combination of the image reading process and the print process in which an image(s) is printed based on an image(s) read in the image reading process.

For example, the image processing apparatus 10 is a multifunction peripheral that can execute the copy process and the image data transmission process. It is noted that the image processing apparatus 10 may be a scanner, a copier, or a facsimile apparatus.

As shown in FIG. 1, the image processing apparatus 10 includes an image reading device 1, an image forming device 2, a user interface unit 7, and a control device 8. The image reading device 1 executes the image reading process.

[Image Reading Device 1]

As shown in FIG. 1, the image reading device 1 includes a platen glass 13, a contact glass 13a, an image sensor unit 110, a movable support device 11, and a platen cover 12. The platen glass 13 is a transparent glass plate on which a document sheet 9 is placed. The platen cover 12 incorporates an automatic document sheet conveying device 14.

A document sheet 9 is placed on the platen glass 13 or a document sheet(s) 9 is conveyed by the automatic document sheet conveying device 14. It is noted that the platen glass 13 and the automatic document sheet conveying device 14 are each an example of a document sheet support portion that supports the document sheet(s) 9.

The document sheet(s) 9 is a target of image reading. The platen cover 12 is supported by a main body portion of the image reading device 1 such that it can be displaced between a closing position where it covers the platen glass 13 and an opening position where it opens a space above the platen glass 13. The platen cover 12 is an example of a cover member.

The image reading device 1 further includes a cover sensor 123 that is configured to detect the platen cover 12 located at the closing position. For example, the cover sensor 123 may be a contact switch that changes its state when it comes into contact with the platen cover 12 located at the closing position. Alternatively, the cover sensor 123 may be a photo sensor that detects the platen cover 12 when the platen cover 12 is located at the closing position.

The automatic document sheet conveying device 14 includes a document sheet feeding mechanism 141 and a plurality of document sheet conveyance rollers 142. The document sheet feeding mechanism 141 feeds the document sheet(s) 9 placed on a supply document sheet tray 121 onto a document sheet conveyance path 140.

The document sheet conveyance path 140 is formed along a route that passes a predetermined reading position P0. The plurality of document sheet conveyance rollers 142 convey the document sheet 9 along the document sheet conveyance path 140, and discharge the document sheet 9 onto a discharge document sheet tray 122.

The image reading device 1 further includes a first document sheet sensor 124 and a second document sheet sensor 125. The first document sheet sensor 124 detects the document sheet 9 placed on the supply document sheet tray 121. The second document sheet sensor 125 detects the document sheet(s) 9 placed on the discharge document sheet tray 122.

For example, the first document sheet sensor 124 and the second document sheet sensor 125 may each be a contact switch that changes its state when it comes into contact with the document sheet(s) 9. Alternatively, the first document sheet sensor 124 and the second document sheet sensor 125 may each be a photo sensor that detects the document sheet(s) 9.

When a document sheet 9 is conveyed by the automatic document sheet conveying device 14, the image sensor unit 110 reads an image from the document sheet 9 passing the reading position P0. In this case, the movable support device 11 holds the image sensor unit 110 at a position that faces the reading position P0.

On the other hand, when a document sheet 9 is placed on the platen glass 13, the movable support device 11 moves the image sensor unit 110 along the platen glass 13. This allows the image sensor unit 110 to read an image from the document sheet 9 on the platen glass 13.

The image sensor unit 110 outputs read image data to the control device 8, the read image data representing an image read from the document sheet 9. Specifically, the image sensor unit 110 outputs a plurality of pieces of line image data in sequence. Each of the plurality of pieces of line image data represents a line of image that extends along a main scanning direction of the document sheet 9.

[Image Forming Device 2]

The image forming device 2 shown in FIG. 1 forms a toner image on a sheet by an electrophotographic system. It is noted that the image forming device 2 may form an image on a sheet by another system such as an ink jet system.

As shown in FIG. 1, the image forming device 2 includes a sheet conveying device 401 and an image forming portion 4. The image forming portion 4 includes a laser scanning unit 40, image creation units 4x, a transfer device 44, and a fixing device 46. The image creation units 4x each include a photoconductor 41, a charging device 42, and a developing device 43.

As shown in FIG. 1, the image forming device 2 is a tandem-type color image forming device. Accordingly, the image forming device 2 includes the plurality of image creation units 4x that respectively correspond to toner of different colors, and the transfer device 44 includes an intermediate transfer belt 440, a plurality of primary transfer devices 441, and a secondary transfer device 442.

The sheet conveying device 401 feeds a sheet from a sheet supply portion 400 into a sheet conveyance path 402, and further conveys the sheet along the sheet conveyance path 402. The sheet conveying device 401 then discharges the sheet from the sheet conveyance path 402 onto a discharged sheet tray 22.

In each of the image creation units 4x, the charging device 42 charges the surface of the photoconductor 41, and the laser scanning unit 40 writes an electrostatic latent image on the charged surface of the photoconductor 41.

Furthermore, in each of the image creation units 4x, the developing device 43 develops the electrostatic latent image on the photoconductor 41 into a toner image, and the primary transfer device 441 transfers the toner image from the photoconductor 41 onto the intermediate transfer belt 440 while the intermediate transfer belt 440 is rotationally moving.

The secondary transfer device 442 transfers the toner images from the intermediate transfer belt 440 onto a sheet that is moving along the sheet conveyance path 402. The fixing device 46 fixes the toner images to the sheet by heating the toner images on the sheet.

[User Interface Unit 7]

As shown in FIG. 1, the user interface unit 7 includes an operation device 7a and a display device 7b. For example, the display device 7b includes a panel display such as a liquid crystal panel, and the operation device 7a includes a touch panel and operation buttons.

[Control Device 8]

The control device 8 executes data processing on various types of data such as image data obtained by the image reading device 1. Furthermore, the control device 8 controls various types of electric devices of the image processing apparatus 10 based on input information that is input through the operation device 7a, and detection results of various types of sensors.

As shown in FIG. 2, the control device 8 includes a CPU (Central Processing Unit) 80, a RAM (Random Access Memory) 81, a secondary storage device 82, and a communication device 83.

The CPU 80 is a processor that performs various types of calculations, data processing, and control of various types of electric devices included in the image processing apparatus 10. The CPU 80 is configured to exchange data and a control signal with the image reading device 1, the image forming device 2, the user interface unit 7, the secondary storage device 82, and the communication device 83.

It is noted that a part or all of the CPU 80 may be replaced with another processor such as a DSP (Digital Signal Processor).

The communication device 83 is a communication interface device configured to perform communications with other apparatuses, such as the host apparatus 100, via the network 800. The CPU 80 performs all of data transmissions and receptions to/from the host apparatus 100 via the communication device 83. For example, the communication device 83 performs a communication based on a predetermined communication standard such as IEEE 802.3.

The secondary storage device 82 is a computer-readable non-volatile storage device. The secondary storage device 82 stores programs executed by the CPU 80 and various types of data. In the present embodiment, the data stored in the secondary storage device 82 can be rewritten by the CPU 80.

For example, a flash memory or an EEPROM (Electrically Erasable Programmable Read-Only Memory) may be adopted as the secondary storage device 82.

The RAM 81 is a volatile storage device configured to primarily store: a program executed by the CPU 80; and data that is output and consulted during an execution of the program by the CPU 80. The RAM 81 provides data access at a higher speed than the secondary storage device 82.

Meanwhile, for example, in the copy process, if the print process is executed after a document sheet(s) 9 is removed from the platen glass 13 or the discharge document sheet tray 122 of the image reading device 1, the completion of the copy process is delayed.

On the other hand, there are cases where if the document sheet 9 is not taken from the platen glass 13 or the discharge document sheet tray 122, it is not a big problem. That is, forgetting to take the document sheet 9 is not a big problem if the document sheet 9 does not contain information that should be prevented from being leaked. In such a case, it is preferable to prioritize speeding up image processing such as the copy process over preventing the document sheet 9 from being left behind.

In general, users of the image processing apparatus 10 rarely forget to take prints discharged to the discharged sheet tray 22, but often forget to take the document sheet(s) 9. It is thus important to prevent information from being leaked from the document sheet(s) 9 that has been forgotten to be taken from the image processing apparatus 10.

In the image processing apparatus 10, the CPU 80 performs a read image output control that is described below. This allows the image processing apparatus 10 to automatically switch, based on the content of the document sheet 9, between preventing the document sheet 9 from being taken from the image reading device 1 and speeding up image processing such as the copy process.

The read image output control includes a control to cause the image reading device 1 to perform the image reading process, and a control to cause the image forming device 2 or the communication device 83 to perform the image output process based on the read image obtained by the image reading process.

In the present embodiment, the read image output process is the print process executed by the image forming device 2, or the image data transmission process executed by the communication device 83.

The CPU 80 operates as a main control portion 8a, a reading control portion 8b, a print control portion 8c, a protection-target document sheet determining portion 8d, and a document sheet removal determining portion 8e by executing a computer program PR0 that is stored in the secondary storage device 82 in advance.

The main control portion 8a detects an operation performed on the operation device 7a, and controls the display device 7b. The reading control portion 8b controls the image reading device 1. The print control portion 8c controls the image forming device 2. The protection-target document sheet determining portion 8d executes a protection-target image determining process that is described below.

The document sheet removal determining portion 8e determines whether or not a first removal operation has been performed on the image reading device 1 after the image reading process was executed on a document sheet 9 placed on the platen glass 13. The first removal operation is a user's operation to remove the document sheet 9 from the surface of the platen glass 13.

Furthermore, the document sheet removal determining portion 8e determines whether or not a second removal operation has been performed on the image reading device 1 after the image reading process was executed on a document sheet(s) 9 conveyed by the automatic document sheet conveying device 14. The second removal operation is a user's operation to remove the document sheet(s) 9 from the discharge document sheet tray 122.

The document sheet removal determining portion 8e determines that the first removal operation has been performed, when the cover sensor 123 has changed from a state of detecting the platen cover 12 at the closing position to a state of not detecting the platen cover 12. In other words, the cover sensor 123 detects the first removal operation when the cover sensor 123 changes from the state of detecting the platen cover 12 at the closing position to the state of not detecting the platen cover 12.

In addition, the document sheet removal determining portion 8e determines that the second removal operation has been performed, when the second document sheet sensor 125 has changed from a state of detecting a document sheet(s) 9 to a state of not detecting the document sheet(s) 9. In other words, the second document sheet sensor 125 detects the second removal operation when it changes from the state of detecting the document sheet(s) 9 to the state of not detecting the document sheet(s) 9.

It is noted that the cover sensor 123 and the second document sheet sensor 125 are each an example of an operation detection sensor configured to detect a removal operation of removing a document sheet(s) 9 from a document sheet support portion.

[Read Image Output Control]

Figure 3:
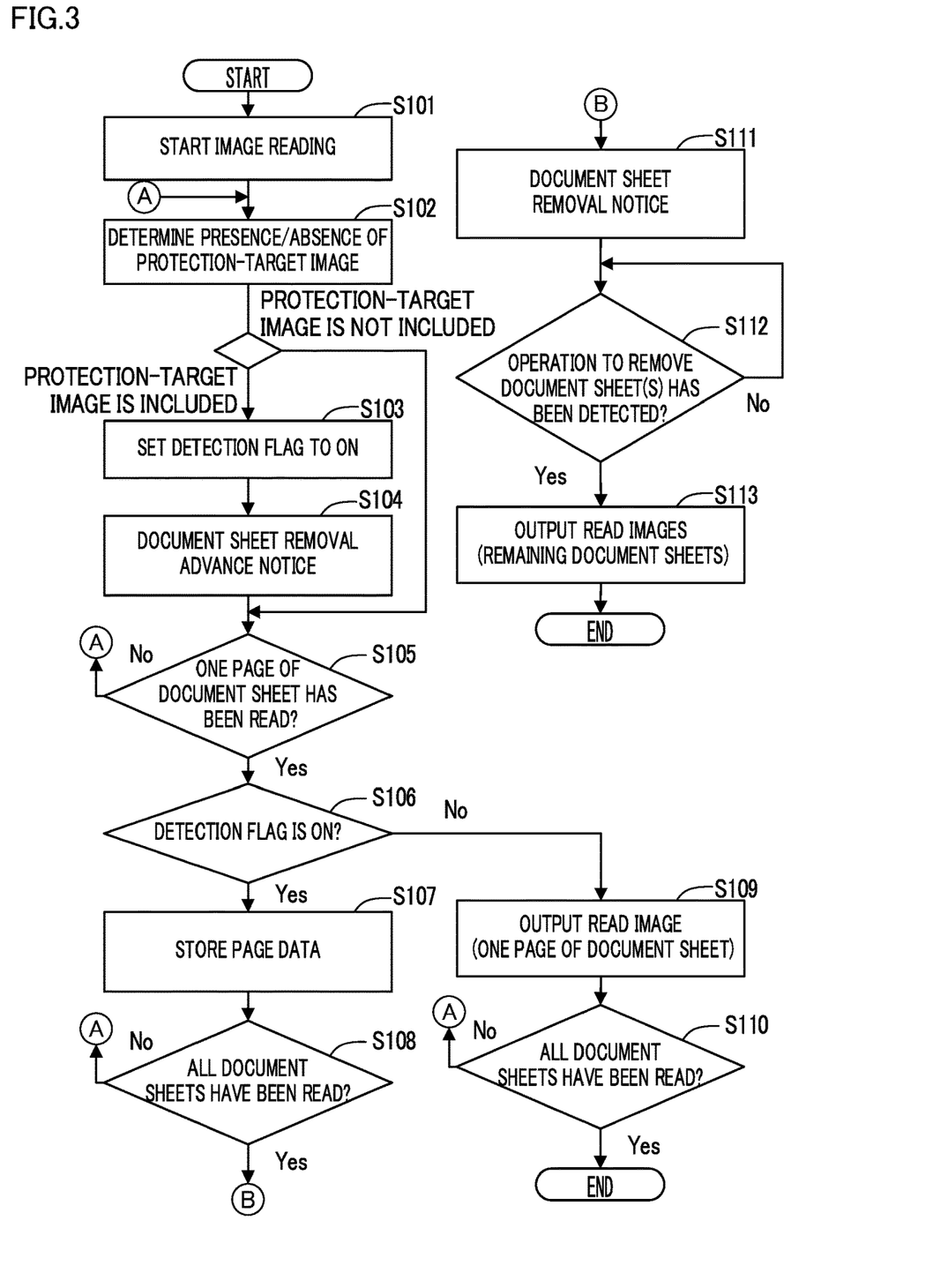
FIG. 3 is a flowchart showing an example of a procedure of a read image output control performed in the image processing apparatus according to the first embodiment.

The following describes an example of a procedure of the read image output control with reference to a flowchart shown in FIG. 3.

The main control portion 8a starts the read image output control upon detecting that a predetermined start operation such as a copy start operation or a data transmission start operation has been performed on the operation device 7a.

In the following description, S101, S102, ... are identification signs representing a plurality of steps of the read image output control of the present embodiment.

<Step S101>

In the read image output control, first the reading control portion 8b allows the image reading device 1 to start the image reading process.

Specifically, when the first document sheet sensor 124 is in the state of detecting a document sheet 9 on the supply document sheet tray 121, the reading control portion 8b causes the movable support device 11 to hold the image sensor unit 110 at the position that faces the reading position P0.

Furthermore, the reading control portion 8b causes the image sensor unit 110 to execute the image reading process while operating the automatic document sheet conveying device 14. This allows the image reading process to be executed on all of document sheets 9 that are placed on the supply document sheet tray 121 to be conveyed by the automatic document sheet conveying device 14.

On the other hand, when the first document sheet sensor 124 is in the state of not detecting the document sheet(s) 9 on the supply document sheet tray 121, the reading control portion 8b causes the image sensor unit 110 to execute the image reading process while operating the movable support device 11. This allows the image reading process to be executed on a document sheet 9 placed on the platen glass 13 so that one page of image is read.

In the following description, a portion of the image reading device 1 on which a document sheet(s) 9 is present after the image reading process is executed, is referred to as a document sheet present portion. That is, in a case where the image reading process is executed on a document sheet(s) 9 conveyed by the automatic document sheet conveying device 14, the discharge document sheet tray 122 is the document sheet present portion. On the other hand, in a case where the image reading process is executed on a document sheet 9 placed on the platen glass 13, the platen glass 13 is the document sheet present portion.

<Step S102>

Subsequently, the protection-target document sheet determining portion 8d executes the protection-target image determining process. In the protection-target image determining process, it is determined whether or not the read image obtained by the image reading device 1 includes a protection-target image that satisfies a predetermined protection condition.

In the present embodiment, the protection condition includes a first protection condition and a second protection condition. Protection condition data DA0 representing the first protection condition and the second protection condition is stored in the secondary storage device 82 in advance. The protection-target document sheet determining portion 8d executes the protection-target image determining process based on the protection condition data DA0.

The first protection condition is that the protection-target image is a character sequence image that represents any one of one or more predetermined registered character sequences. For example, the registered character sequences may include a character sequence, such as "secret" or "confidential", that indicates that content of a document sheet(s) 9 is confidential. In addition, the registered character sequences may include an organization name, a telephone number, or a product name that should be kept secret to the outside of the company.

The protection-target document sheet determining portion 8d executes a well-known character recognition process on a read image(s) so as to extract character sequences from the read image(s), and determine whether or not the extracted character sequences include a registered character sequence. In a case where character sequences extracted from the read image(s) include a registered character sequence, the protection-target document sheet determining portion 8d determines that a protection-target image representing the registered character sequence is included in the read image.

The second protection condition is that the protection-target image is the same as any one of one or more predetermined registered marks. For example, the registered marks may include a predetermined confidentiality mark indicating that content of the document sheet 9 is confidential, a predetermined company emblem, a predetermined trademark, and a telephone mark indicating that a telephone number(s) is written.

The protection-target document sheet determining portion 8d extracts partial images of the read image one by one, and performs a pattern matching between each extracted partial image and the registered marks. In a case where a degree of similarity between the extracted partial image and any one of the registered marks exceeds a predetermined standard degree of similarity, the protection-target document sheet determining portion 8d determines that a protection-target image that is the same as a registered mark is included in the read image.

Upon determining that a protection-target image is included in the read image, the protection-target document sheet determining portion 8d moves the process to step S103, and otherwise moves the process to step S105.

<Step S103>

In step S103, the protection-target document sheet determining portion 8d sets a detection flag to ON to indicate that the read image includes a protection-target image. Thereafter, the protection-target document sheet determining portion 8d moves the process to step S104. It is noted that the default value of the detection flag is OFF.

<Step S104>

In step S104, the main control portion 8a outputs a predetermined advance notice via the display device 7b. The advance notice indicates that the document sheet 9 needs to be removed from the document sheet present portion for the print process to be completed. Thereafter, the main control portion 8a moves the process to step S105.

<Step S105>

In step S105, the reading control portion 8b determines whether or not one page of document sheet 9 has been read. Upon determining that one page of document sheet 9 has been read, the reading control portion 8b moves the process to step S106, and otherwise moves the process to step S102.

<Step S106>

In step S106, the main control portion 8a determines whether or not the detection flag is ON. Upon determining that the detection flag is ON, the main control portion 8a moves the process to step S107, and otherwise moves the process to step S109.

<Step S107>

In step S107, the reading control portion 8b stores page data in the secondary storage device 82, wherein the page data is read image data of one page of document sheet 9. Thereafter, the reading control portion 8b moves the process to step S108.

<Step S108>

In step S108, the reading control portion 8b determines whether or not all document sheets 9 have been read. Upon determining that all document sheets 9 have been read, the reading control portion 8*b* moves the process to step S111, and otherwise moves the process to step S102.

It is noted that in a case where the image reading process is executed on a document sheet 9 placed on the platen glass 13, the reading control portion 8*b* determines that all document sheets 9 have been read when one page of document sheet 9 has been read.

In addition, in a case where the image reading process is executed on a document sheet(s) 9 conveyed by the automatic document sheet conveying device 14, the reading control portion 8*b* makes the determination in step S108 based on a detection result of the first document sheet sensor 124.

That is, the reading control portion 8*b* determines that all document sheets 9 have been read, when one piece of document sheet 9 has been read after the first document sheet sensor 124 changed from a state of detecting the document sheet 9 to a state of not detecting the document sheet 9.

<Step S109>

In step S109, the main control portion 8*a* or the print control portion 8*c* causes the communication device 83 or the image forming device 2 to execute the read image output process with regard to one page of document sheet 9. Thereafter, the main control portion 8*a* or the print control portion 8*c* moves the process to step S110.

In a case where the read image output control is started in response to a data transmission start operation, the read image output process is the image data transmission process performed by the communication device 83. In addition, in a case where the read image output control is started in response to a copy start operation, the read image output process is the print process performed by the image forming device 2 based on the read image.

It is noted that the image forming device 2 that executes the print process is an example of an image output device. Furthermore, the communication device 83 that executes the image data transmission process in which data of a read image is output to outside is also an example of the image output device.

In addition, the image processing apparatus 10 may include a memory interface device to which the external storage device can be attached. In this case, in step S109 and step S113 that is described below, the main control portion 8*a* may execute the image data recording process via the memory interface device. In this case, the memory interface device is also an example of the image output device.

<Step S110>

In step S110, the reading control portion 8*b* ends the read image output control when all document sheets 9 have been read, and otherwise moves the process to step S102.

<Step S111>

In step S111, the main control portion 8*a* outputs a predetermined document sheet removal notice via the display device 7*b*. The document sheet removal notice indicates that the document sheet 9 needs to be removed from the document sheet present portion for the print process to be completed. Thereafter, the main control portion 8*a* moves the process to step S112.

<Step S112>

In step S112, the document sheet removal determining portion 8*e* determines whether or not an operation to remove the document sheet(s) 9 from the document sheet present portion has been performed.

Specifically, when the document sheet present portion is the platen glass 13, the document sheet removal determining portion 8*e* determines whether or not the cover sensor 123 has detected the first removal operation. On the other hand, when the document sheet present portion is the discharge document sheet tray 122, the document sheet removal determining portion 8*e* determines whether or not the second document sheet sensor 125 has detected the second removal operation.

The document sheet removal determining portion 8*e* waits until it determines that a document sheet(s) 9 has been removed from the document sheet present portion. Upon determining that the document sheet(s) 9 has been removed from the document sheet present portion, the document sheet removal determining portion 8*e* moves the process to step S113.

<Step S113>

In step S113, the main control portion 8*a* or the print control portion 8*c* causes the communication device 83 or the image forming device 2 to execute the read image output process. Thereafter, the main control portion 8*a* or the print control portion 8*c* ends the document sheet image output process.

In step S113, as in step S109, the main control portion 8*a* causes the communication device 83 to execute the image data transmission process, or the print control portion 8*c* causes the image forming device 2 to execute the print process based on the read image.

In a case where the image reading process is executed on document sheets 9 conveyed by the automatic document sheet conveying device 14, there is a possibility that the read image output process has been executed in step S109 on a part of the document sheets 9 from which no protection-target image had been detected.

In a case where the read image output process has been executed in step S109 on a part of the document sheets 9, the main control portion 8*a* or the print control portion 8*c* executes the read image output process on the remaining document sheets 9 in step S113.

On the other hand, In a case where the read image output process has not been executed in step S109 on a part of the document sheets 9, the main control portion 8*a* or the print control portion 8*c* executes the read image output process on all of the document sheets 9 in step S113.

As described above, in a case where it has been determined that a protection-target image is included in the read image, the main control portion 8*a* or the print control portion 8*c* causes the communication device 83 or the image forming device 2 to execute the read image output process only after the removal operation is detected after an image(s) is read from a document sheet(s) 9 by the image reading device 1 (step S112, S113).

The image processing apparatus 10 determines whether or not a document sheet(s) 9 contains information that should be prevented from being leaked, by determining whether or not a read image(s) contains a protection-target image (steps S101 to S103).

Furthermore, upon determining that a document sheet(s) 9 contains information that should be prevented from being leaked, the image processing apparatus 10 executes processes of steps S111 to S113 as the measures for preventing the document sheet(s) 9 from being forgotten to be taken. This makes it possible to prevent information from being leaked from a document sheet(s) 9 left on the platen glass 13 or the discharge document sheet tray 122.

On the other hand, upon determining that a document sheet(s) 9 does not contain information that should be prevented from being leaked, the image processing apparatus 10 prioritizes speeding up the read image output process over preventing the document sheet(s) 9 from being left behind (steps S109, S110).

That is, the image processing apparatus 10 can automatically select which to prioritize, based on the content of the document sheet(s) 9, preventing the document sheet(s) 9 from being taken from the image reading device 1, or speeding up the image processing.

Embodiment 2

Figure 4:
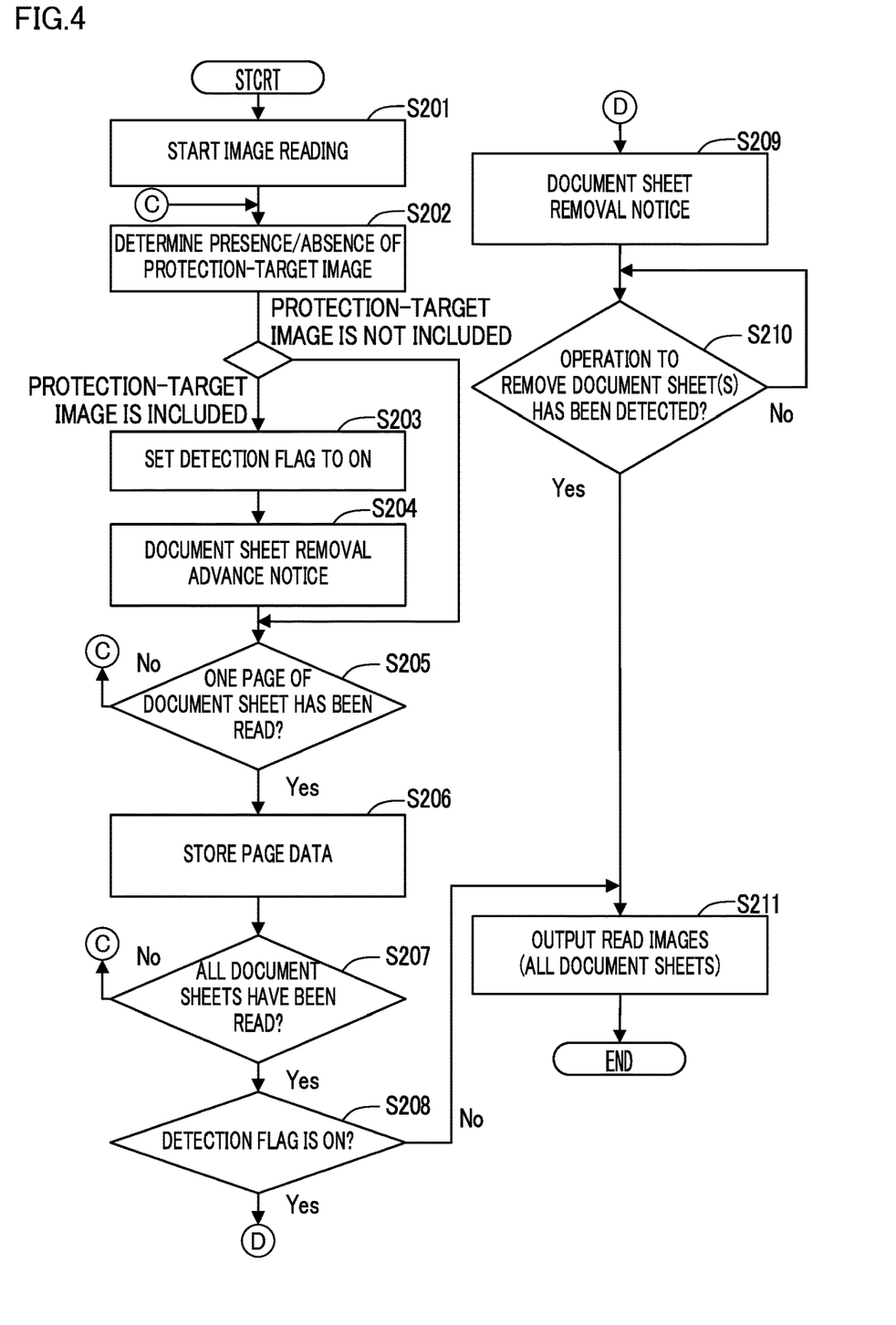
FIG. 4 is a flowchart showing an example of a procedure of a read image output control performed in an image processing apparatus according to a second embodiment.

Next, with reference to FIG. 4, a description is given of an example of a procedure of the read image output control of an image processing apparatus according to a second embodiment. The image processing apparatus according to the present embodiment has the same configuration as the image processing apparatus 10.

In the read image output control, the image reading process may be executed on a plurality of document sheets 9 conveyed by the automatic document sheet conveying device 14, and a protection-target image may be detected from any one of the second page and onward of the document sheets 9.

In the above-described case, the CPU 80 of the first embodiment causes the communication device 83 or the image forming device 2 to execute the read image output process with regard to a page(s) before a protection-target image is detected, without waiting for a detection of the removal operation.

On the other hand, the CPU 80 of the present embodiment causes the communication device 83 or the image forming device 2 to execute the read image output process with regard to all document sheets 9 after determining whether or not a protection-target image is included in images read from all document sheets.

The following describes an example of a procedure of the read image output control according to the present embodiment with reference to FIG. 4. In the following description, S201, S202, . . . are identification signs representing a plurality of steps of the read image output control of the present embodiment.

<Steps S201 to S205>

Steps S201 to S204 are the same as steps S101 to S104 shown in FIG. 3. In step S205, the reading control portion 8*b* determines whether or not one page of document sheet 9 has been read. Upon determining that one page of document sheet 9 has been read, the reading control portion 8*b* moves the process to step S206, and otherwise moves the process to step S202.

<Step S206>

Step S206 is the same as step S107 shown in FIG. 3. In step S206, the reading control portion 8*b* stores the page data in the secondary storage device 82, and then moves the process to step S207.

<Step S207>

In step S207, the reading control portion 8*b* determines whether or not all document sheets 9 have been read. Upon determining that all document sheets 9 have been read, the reading control portion 8*b* moves the process to step S208, and otherwise moves the process to step S202.

<Step S208>

In step S208, the main control portion 8*a* determines whether or not the detection flag is ON. Upon determining that the detection flag is ON, the main control portion 8*a* moves the process to step S209, and otherwise moves the process to step S211.

<Step S209>

Step S209 is the same as step S111 shown in FIG. 3. The main control portion 8*a* moves the process from step S209 to step S210.

<Step S210>

In step S210, as in step S112 shown in FIG. 3, the document sheet removal determining portion 8*e* determines whether or not a document sheet(s) 9 has been removed from the document sheet present portion.

The document sheet removal determining portion 8*e* waits until it determines that the document sheet(s) 9 has been removed from the document sheet present portion. Upon determining that the document sheet(s) 9 has been removed from the document sheet present portion, the document sheet removal determining portion 8*e* moves the process to step S211.

<Step S211>

In step S211, the main control portion 8*a* or the print control portion 8*c* causes the communication device 83 or the image forming device 2 to execute the read image output process with regard to all document sheets 9. Thereafter, the main control portion 8*a* or the print control portion 8*c* ends the document sheet image output process.

In the present embodiment, as in the first embodiment, in a case where it has been determined that a protection-target image is included in the read image, the main control portion 8*a* or the print control portion 8*c* causes the communication device 83 or the image forming device 2 to execute the read image output process only after the removal operation is detected after an image(s) is read from a document sheet(s) 9 by the image reading device 1 (steps S210, S211).

The present embodiment produces the same advantageous effects as the first embodiment.

Application Example

An image processing apparatus according to an application example of the first embodiment or the second embodiment has the same configuration as the image processing apparatus 10.

In the present application example, the CPU 80 also functions as a user identification portion by executing the computer program PR0. The user identification portion receives input of user information via an information input device such as the operation device 7*a*. The user information is input for identification of each user and is, for example, a combination of a user ID and a password.

Furthermore, the user identification portion is configured to identify whether or not the user information matches a predetermined specific user. For example, information of the specific user is stored in the secondary storage device 82 in advance.

It is noted that the user identification portion is an example of a user identification device. In addition, the image processing apparatus according to the present application example may include a card reader that can read the user information from an IC card.

In addition, the image processing apparatus according to the present application example may include a camera that can photograph a biological image such as a user's face or fingerprint. In this case, the user identification portion identifies whether or not data of the biological image matches that of the specific user. The data of the biological image is an example of user information.

Furthermore, in the present application example, in step S112 shown in FIG. 3 or step S210 shown in FIG. 4, the main control portion 8*a* checks the identification result of the user identification portion as well as determining whether the document sheet 9 has been removed from the document sheet present portion, as the necessary condition for the read image output process to be executed.

That is, the main control portion 8*a* determines further as the necessary condition whether or not the user information matches the specific user, or whether the user information does not match the specific user.

When the necessary condition is satisfied, the main control portion 8*a* or the print control portion 8*c* causes the communication device 83 or the image forming device 2 to execute the read image output process. The present application example produces the same advantageous effects as the first embodiment or the second embodiment.

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

The invention claimed is:

1. An image processing apparatus comprising:
an automatic document sheet conveying device configured to feed a document sheet from a supply document sheet tray, convey the document sheet along a document sheet conveyance path that passes a predetermined reading position, and discharge the document sheet onto a discharge document sheet tray;
an image reading device configured to read an image from the document sheet that passes the predetermined reading position;
a protection-target document sheet determining portion configured to determine whether or not a protection-target image is included in a read image that is obtained by the image reading device, the protection-target image satisfying a predetermined protection condition;
an operation detection sensor configured to detect a removal operation of removing the document sheet from the discharge document sheet tray when the operation detection sensor changes from a state of detecting the document sheet on the discharge document sheet tray to a state of not detecting the document sheet;
an image output device configured to execute a read image output process that includes printing the read image or outputting data of the read image to outside; and
a control device configured to, in a case where the protection-target document sheet determining portion has determined that the protection-target image is included in the read image, cause the image output device to execute the read image output process only after the operation detection sensor detects the removal operation after the image reading device reads the image from the document sheet, and in a case where the protection-target document sheet determining portion has determined that the protection-target image is not included in the read image, automatically cause the image output device to execute the read image output process after the image reading device reads the image from the document sheet, regardless of whether the operation detection sensor detects the removal operation.

2. The image processing apparatus according to claim 1, further comprising:
a user identification portion configured to receive input of user information and identify whether or not the user information matches a predetermined specific user, wherein
the control device causes the image output device to execute the read image output process further only after it is confirmed that the user information matches the specific user, or further only after it is confirmed that the user information does not match the specific user.

3. The image processing apparatus according to claim 1, wherein
the protection-target image includes either or both of: a character sequence image that represents any one of one or more predetermined registered character sequences; and an image that is same as any one of one or more predetermined registered marks.

* * * * *